(12) United States Patent
Santillan

(10) Patent No.: US 10,442,410 B1
(45) Date of Patent: Oct. 15, 2019

(54) VEHICLE TRACTION DEICING SYSTEM

(71) Applicant: Jesus Guzman Santillan, Lawrence, MA (US)

(72) Inventor: Jesus Guzman Santillan, Lawrence, MA (US)

( * ) Notice: Subject to any disclaimer, the term of this patent is extended or adjusted under 35 U.S.C. 154(b) by 23 days.

(21) Appl. No.: 15/865,440

(22) Filed: Jan. 9, 2018

(51) Int. Cl.
| | | |
|---|---|---|
| B60S 1/68 | (2006.01) | |
| B60S 1/48 | (2006.01) | |
| B60S 1/52 | (2006.01) | |
| B60S 1/50 | (2006.01) | |
| B05B 12/10 | (2006.01) | |
| B05B 9/00 | (2006.01) | |
| B05B 9/04 | (2006.01) | |

(52) U.S. Cl.
CPC ............. *B60S 1/68* (2013.01); *B60S 1/481* (2013.01); *B60S 1/488* (2013.01); *B60S 1/50* (2013.01); *B60S 1/52* (2013.01); *B05B 9/002* (2013.01); *B05B 9/0423* (2013.01); *B05B 12/10* (2013.01)

(58) Field of Classification Search
CPC .... B60S 1/68; B60S 1/50; B60S 1/488; B60S 1/481; B60S 1/52; B05B 9/0423; B05B 9/002; B05B 12/10
See application file for complete search history.

(56) References Cited

U.S. PATENT DOCUMENTS

| | | | | |
|---|---|---|---|---|
| 1,877,475 A | * | 9/1932 | Cowan .................... | B60B 39/04 |
| | | | | 291/19 |
| 2,388,114 A | * | 10/1945 | Boyce ...................... | B60S 1/68 |
| | | | | 180/313 |
| 3,336,064 A | * | 8/1967 | Dzaack .................... | B60B 39/02 |
| | | | | 152/208 |
| 3,401,707 A | * | 9/1968 | Horwitz .................... | B05B 1/14 |
| | | | | 134/100.1 |
| 4,203,423 A | * | 5/1980 | Ricci ...................... | B60B 39/023 |
| | | | | 126/271.1 |
| 4,789,190 A | * | 12/1988 | Eike ........................ | B60B 39/02 |
| | | | | 118/320 |
| 4,834,320 A | * | 5/1989 | Tyson .................... | B64C 25/001 |
| | | | | 244/100 R |
| 4,848,510 A | * | 7/1989 | Ahmed ................. | B60B 39/028 |
| | | | | 180/309 |
| 5,057,159 A | * | 10/1991 | Weintraub ............. | B60S 1/481 |
| | | | | 134/171 |
| 5,100,175 A | | 3/1992 | Swallow | |
| 5,118,142 A | * | 6/1992 | Bish ........................ | B60B 39/06 |
| | | | | 222/486 |

(Continued)

FOREIGN PATENT DOCUMENTS

WO        9704970 A        2/1997

*Primary Examiner* — Arthur O. Hall
*Assistant Examiner* — Steven M Cernoch

(57) ABSTRACT

The vehicle traction deicing system comprises a reservoir, a pump, a heater, a plurality of valves, a plurality of nozzles, and an operator interface. The reservoir holds a supply of deicing fluid which the pump moves through the heater, valves, and nozzles. The nozzles are placed in front of and behind each wheel of a vehicle and pointed at the windshield. The valves control the flow of deicing fluid to the various nozzles. The heater heats the deicing fluid prior to dispersal by the nozzles. The operator interface provides a set of controls that allow the vehicle traction deicing system to be turned on and off and to dispense the heated deicing fluid at wheels and at the windshield.

14 Claims, 3 Drawing Sheets

(56) References Cited

U.S. PATENT DOCUMENTS

| | | | |
|---|---|---|---|
| 5,141,160 A | | 8/1992 | Waters |
| 5,301,996 A | * | 4/1994 | Theis .................... B60B 39/026 180/903 |
| 5,350,035 A | * | 9/1994 | Bodier .................. B60B 39/025 180/197 |
| D364,173 S | | 11/1995 | Woods |
| 5,509,606 A | * | 4/1996 | Breithaupt .............. B60S 1/488 239/130 |
| 6,237,861 B1 | | 5/2001 | Northrop |
| 6,848,726 B1 | | 2/2005 | Horsham |
| 7,976,076 B1 | | 7/2011 | Ahern |
| 8,391,695 B2 | * | 3/2013 | Arkashovski ............. B60S 1/50 392/465 |
| 8,882,927 B2 | * | 11/2014 | Fonville .................. B60S 1/482 134/32 |
| 9,278,579 B2 | | 3/2016 | Wansley |
| 9,586,449 B2 | * | 3/2017 | Love ....................... B60R 1/002 |

* cited by examiner

VEHICLE TRACTION DEICING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation, more specifically, a vehicle traction deicing system.

SUMMARY OF INVENTION

The vehicle traction deicing system comprises a reservoir, a pump, a heater, a plurality of valves, a plurality of nozzles, and an operator interface. The reservoir holds a supply of deicing fluid, which the pump moves through the heater, valves, and nozzles. The nozzles are placed in front of and behind each wheel of a vehicle and pointed at the windshield. The valves control the flow of deicing fluid to the various nozzles. The heater heats the deicing fluid prior to dispersal by the nozzles. The operator interface provides a set of controls that allow the vehicle traction deicing system to be turned on and off and to dispense the heated deicing fluid at wheels and at the windshield.

An object of the invention is to dispense deicing fluid at the wheels and windshield of a vehicle.

Another object of the invention is to heat the deicing fluid prior to dispensing.

A further object of the invention is to dispense the heated deicing fluid in front of and behind each wheel.

Yet another object of the invention is to provide an operator interface that allows control of wheel deicing and windshield deicing separately.

These together with additional objects, features and advantages of the vehicle traction deicing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle traction deicing system in detail, it is to be understood that the vehicle traction deicing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle traction deicing system.

It is therefore important that the claims be regarded as including such equivalent construction insofar as they do not depart from the spirit and scope of the vehicle traction deicing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
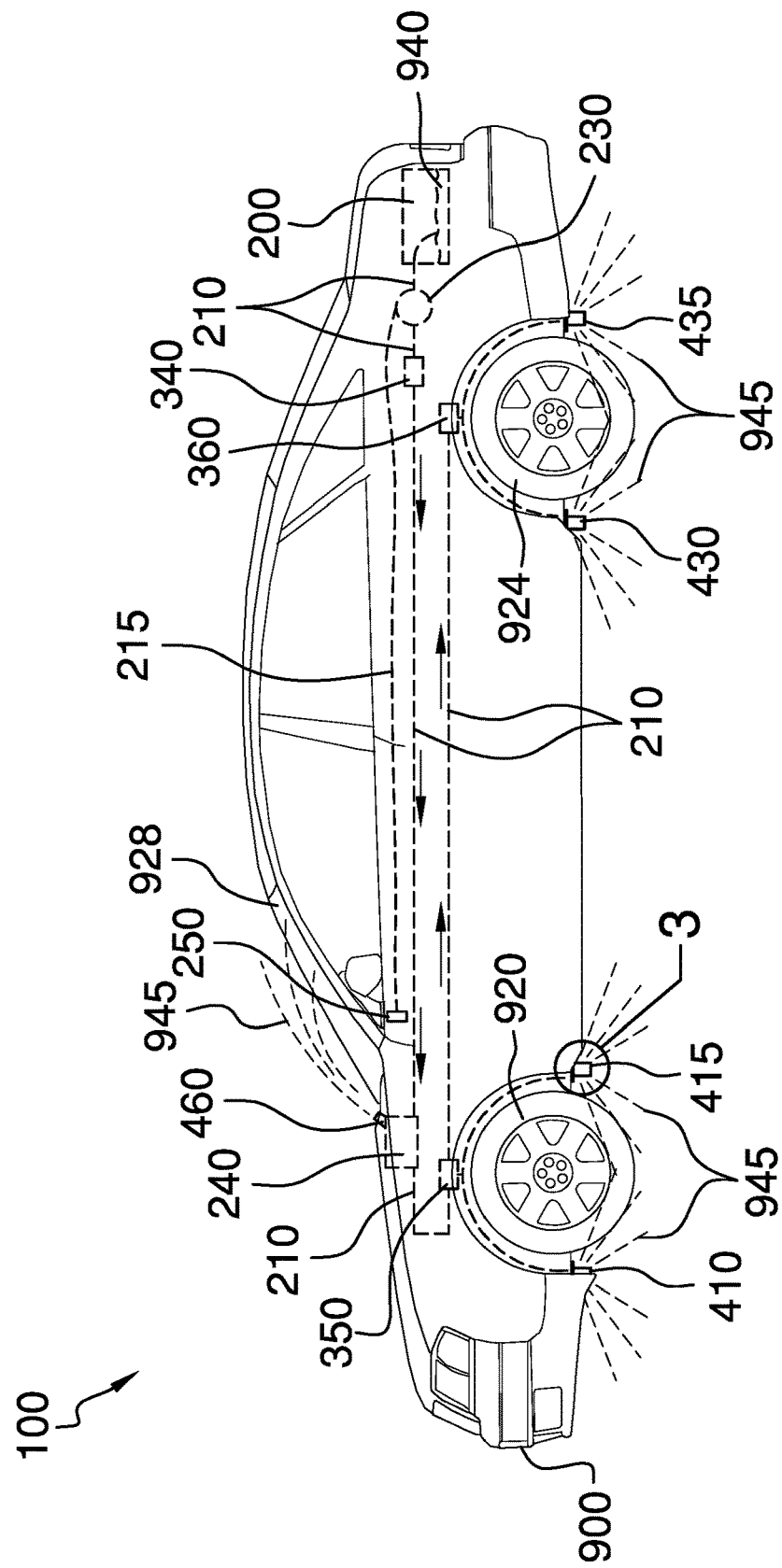
FIG. 1 is a side view of an embodiment of the disclosure.
Figure 2:
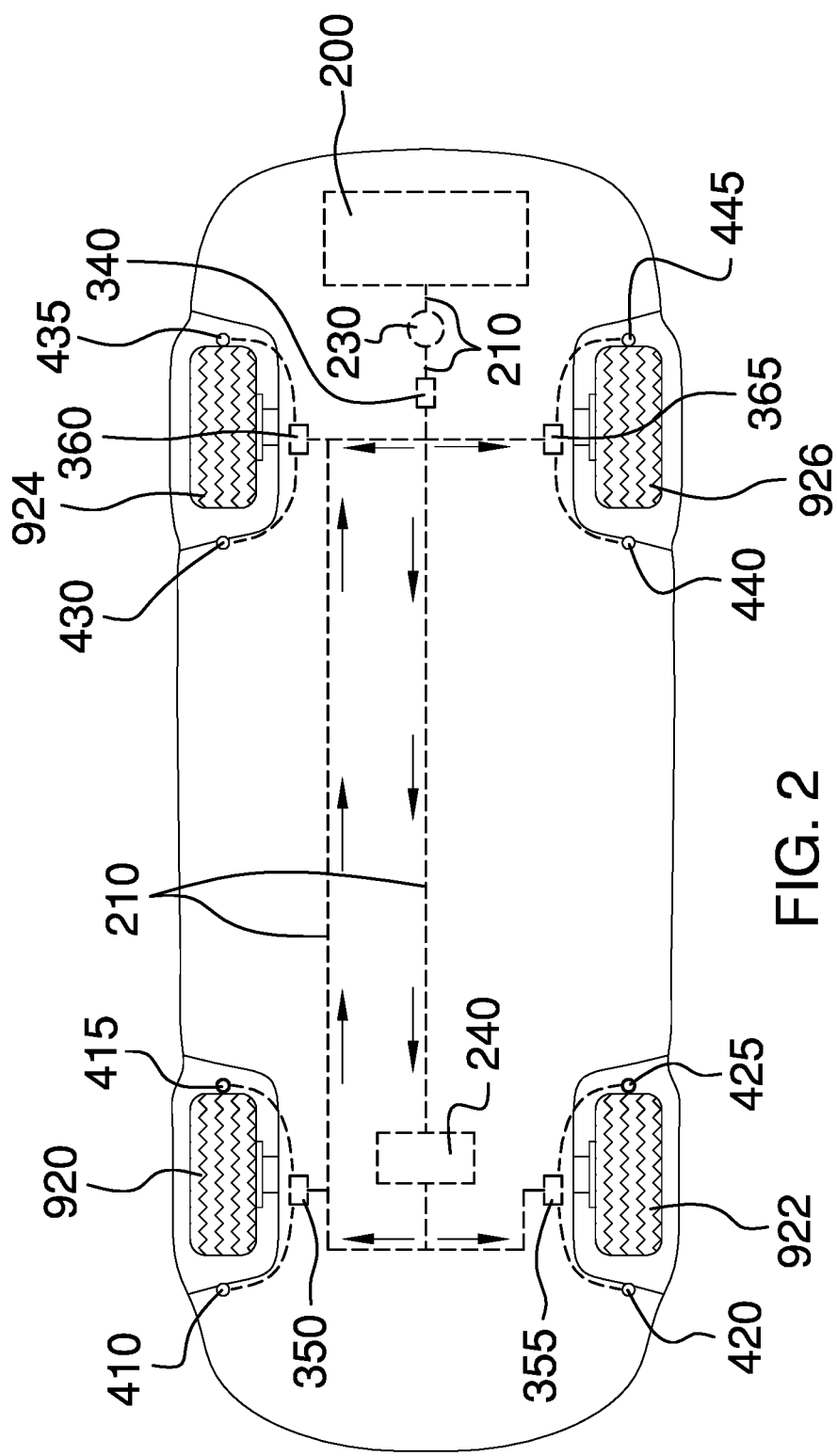
FIG. 2 is a bottom view of an embodiment of the disclosure.
Figure 3:
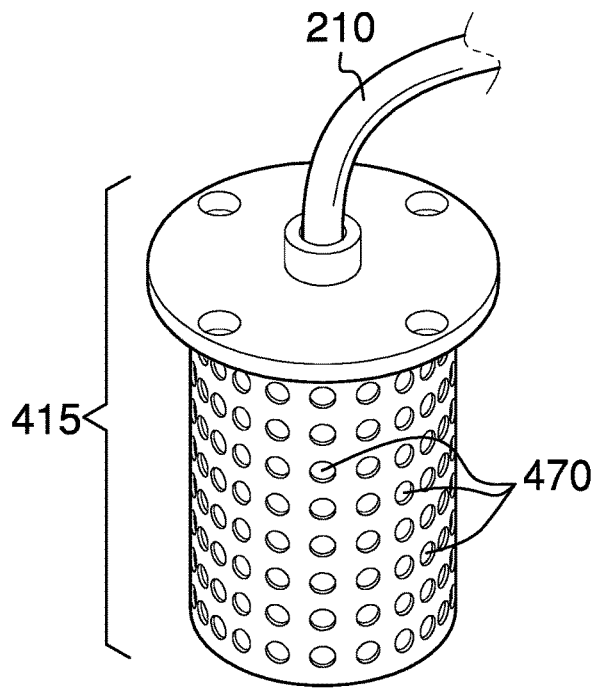
FIG. 3 is a perspective view of an embodiment of the disclosure focusing on a wheel nozzle.
Figure 4:
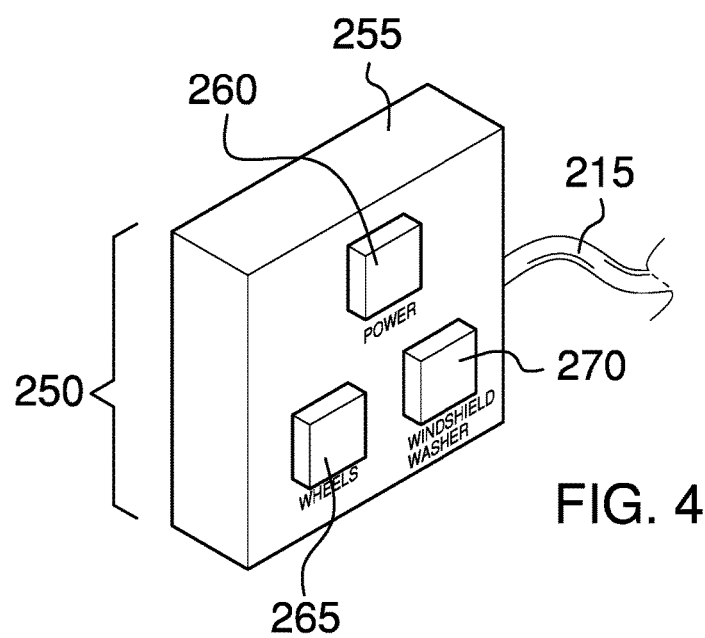
FIG. 4 is a perspective view of an embodiment of the disclosure focusing on the operator interface.

Detailed reference will now be made to a first potential embodiment of the disclosure, which is illustrated in FIGS. 1 through 4.

The vehicle traction deicing system 100 (hereinafter invention) comprises a reservoir 200, a pump 230, a heater 240, a plurality of valves, a plurality of wheel nozzles, at least one windshield nozzle 460, and an operator interface 250. The invention 100 applies heated deicing fluid 945 to the plurality of wheels and/or the windshield 928 of a vehicle 900.

The reservoir 200 may be a holding tank for deicing fluid 940. The reservoir 200 may couple to the pump 230 via one of a plurality of distribution lines 210. The reservoir 200 may be accessible for refilling through a reservoir cap (not illustrated in the figures). As a non-limiting example, the reservoir cap may be exposed in a trunk of the vehicle 900.

The pump 230 may be a device that moves the deicing fluid 940 from a pump inlet to a pump outlet when the pump 230 is energized by an electrical potential applied to the pump 230. The pump inlet may be coupled to the reservoir 200. The pump outlet may be coupled to a main valve 340 via one of the plurality of distribution lines 210.

The main valve 340 may block the flow of the deicing fluid 940 unless energized by an electrical potential applied to the main valve 340. A main valve inlet may be coupled to the pump outlet via one of the plurality of distribution lines 210. A main valve outlet may be coupled to the heater 240.

The heater 240 may be a device that increases the temperature of the deicing fluid 940 as the deicing fluid 940 flows through the heater 240. The deicing fluid 940 may enter the heater 240 at a heater inlet and the heated deicing fluid 945 may exit from the heater 240 via a heater outlet. The source of the heat may be a fluid connection (not illustrated in the figures) to a vehicle radiator cooling system (not illustrated in the figures) or a heating element (not illustrated in the figures) located within the heater 240 that is by an electrical potential applied to the heater 240. The heater 240 may comprise a heater regulator (not illustrated in the figures). The heater regulator may prevent the temperature of the heated deicing fluid 945 from going above a preset temperature limit by removing the electrical potential from the heating element or rerouting the fluid connection when the heated deicing fluid 945 is at or above the preset temperature limit.

The heater outlet couples to the plurality of distribution lines 210 which carry the heated deicing fluid 945 to a left front wheel valve 350, a right front wheel valve 355, a left rear wheel valve 360, and a right rear wheel valve 365.

The heated deicing fluid 945 also flows to a windshield valve (not illustrated in the figures), either via one of the plurality of distribution lines 210 or by direct coupling when the heater 240 comprises the windshield valve.

The plurality of valves comprises the left front wheel valve 350, the right front wheel valve 355, the left rear wheel valve 360, the right rear wheel valve 365, and the windshield valve. The left front wheel valve 350 may block the flow of the heated deicing fluid 945 unless energized by an electrical potential applied to the left front wheel valve 350. A left front wheel valve inlet may be coupled to the heater outlet via the plurality of distribution lines 210. A left front wheel valve outlet may be coupled to a first wheel nozzle 410 and a second wheel nozzle 415 via the plurality of distribution lines 210.

The right front wheel valve 355 may block the flow of the heated deicing fluid 945 unless energized by an electrical potential applied to the right front wheel valve 355. A right front wheel valve inlet may be coupled to the heater outlet via the plurality of distribution lines 210. A right front wheel valve outlet may be coupled to a third wheel nozzle 420 and a fourth wheel nozzle 425 via the plurality of distribution lines 210.

The left rear wheel valve 360 may block the flow of the heated deicing fluid 945 unless energized by an electrical potential applied to the left rear wheel valve 360. A left rear wheel valve inlet may be coupled to the heater outlet via the plurality of distribution lines 210. A left rear wheel valve outlet may be coupled to a fifth wheel nozzle 430 and a sixth wheel nozzle 435 via the plurality of distribution lines 210.

The right rear wheel valve 365 may block the flow of the heated deicing fluid 945 unless energized by an electrical potential applied to the right rear wheel valve 365. A right rear wheel valve inlet may be coupled to the heater outlet via the plurality of distribution lines 210. A right rear wheel valve outlet may be coupled to a seventh wheel nozzle 440 and an eighth wheel nozzle 445 via the plurality of distribution lines 210.

The windshield valve may block the flow of the heated deicing fluid 945 unless energized by an electrical potential applied to the windshield valve. A windshield valve inlet may be coupled to the heater outlet via the plurality of distribution lines 210. A windshield valve outlet may be coupled to the at least one windshield nozzle 460 via the plurality of distribution lines 210.

The plurality of wheel nozzles comprises the first wheel nozzle 410, the second wheel nozzle 415, the third wheel nozzle 420, the fourth wheel nozzle 425, the fifth wheel nozzle 430, the sixth wheel nozzle 435, the seventh wheel nozzle 440, and the eighth wheel nozzle 445. The plurality of wheel nozzles disperse the heated deicing fluid 945 onto the plurality of wheels and onto the ground at the plurality of wheels.

The first wheel nozzle 410 may be coupled to the vehicle 900 in front of a left front wheel 920. The second wheel nozzle 415 may be coupled to the vehicle 900 behind the left front wheel 920. When the heated deicing fluid 945 is pumped to the first wheel nozzle 410 and the second wheel nozzle 415, the first wheel nozzle 410 and the second wheel nozzle 415 may disperse the heated deicing fluid 945 onto the left front wheel 920 and onto the ground in front of and behind the left front wheel 920.

The third wheel nozzle 420 may be coupled to the vehicle 900 in front of a right front wheel 922. The fourth wheel nozzle 425 may be coupled to the vehicle 900 behind the right front wheel 922. When the heated deicing fluid 945 is pumped to the third wheel nozzle 420 and the fourth wheel nozzle 425, the third wheel nozzle 420 and the fourth wheel nozzle 425 may disperse the heated deicing fluid 945 onto the right front wheel 922 and onto the ground in front of and behind the right front wheel 922.

The fifth wheel nozzle 430 may be coupled to the vehicle 900 in front of a left rear wheel 924. The sixth wheel nozzle 435 may be coupled to the vehicle 900 behind the left rear wheel 924. When the heated deicing fluid 945 is pumped to the fifth wheel nozzle 430 and the sixth wheel nozzle 435, the fifth wheel nozzle 430 and the sixth wheel nozzle 435 may disperse the heated deicing fluid 945 onto the left rear wheel 924 and onto the ground in front of and behind the left rear wheel 924.

The seventh wheel nozzle 440 may be coupled to the vehicle 900 in front of a right rear wheel 926. The eighth wheel nozzle 445 may be coupled to the vehicle 900 behind the right rear wheel 926. When the heated deicing fluid 945 is pumped to the seventh wheel nozzle 440 and the eighth wheel nozzle 445, the seventh wheel nozzle 440 and the eighth wheel nozzle 445 may disperse the heated deicing fluid 945 onto the right rear wheel 926 and onto the ground in front of and behind the right rear wheel 926.

An individual nozzle 475 selected from the plurality of wheel nozzles may comprise a plurality of nozzle apertures 470. The heated deicing fluid 945 may be pumped into the individual nozzle 475 via the plurality of distribution lines 210 and may spray out of the plurality of nozzle apertures 470. The diameter of the plurality of nozzle apertures 470 may determine the distance from the individual nozzle 475 that the heated deicing fluid 945 is sprayed. The plurality of nozzle apertures 470 on the individual nozzle 475 may comprise multiple diameters.

The at least one windshield nozzle 460 may be one or more nozzles mounted in front of the windshield 928 and oriented to disperse the heated deicing fluid 945 onto the windshield 928 when the heated deicing fluid 945 is pumped to the at least one windshield nozzle 460 by the pump 230.

The operator interface 250 may control the operation of the invention 100. The operator interface 250 may be located inside of a passenger compartment so that the operator interface 250 is accessible by a driver (not illustrated in the figures). The operator interface 250 may be electrically coupled to a vehicle electrical system (not illustrated in the figures), the pump 230, the heater 240, the main valve 340, the left front wheel valve 350, the left rear wheel valve 360, the left rear wheel valve 360, the right rear wheel valve 365, and the windshield valve via a plurality of wires 215. Note that not all of the plurality of wires 215 are shown in the figures. The operator interface 250 may be powered by the connection to the vehicle electrical system.

The operator interface 250 may comprise a power control 260, a wheel valve control 265, and a windshield valve control 270. The operator interface 250 may comprise a control circuit (not illustrated in the figures) to sense the power control 260, the wheel valve control 265, and the windshield valve control 270 and to energize the heater 240, the pump 230, and the plurality of valves.

Activation of the power control 260 may turn the invention 100 on. Specifically, activation of the power control 260 may energize the pump 230 and the main valve 340 to force the deicing fluid 940 into the heater 240. Activation of the power control 260 may also energize the heater 240. Activation of the power control 260 may also place the control circuit located within the operator interface 250 into a state where the control circuit will recognize and respond to activation of the wheel valve control 265 and the windshield valve control 270. Activation of the power control 260 when the invention 100 is already on may turn the invention 100 off by de-energizing the heater 240, the pump 230, and the plurality of valves, and by causing the control circuit to ignore the wheel valve control 265 and the windshield valve control 270.

Activation of the wheel valve control 265 while the invention 100 is on may cause the control circuit to energize the left front wheel valve 350, the right front wheel valve 355, the left rear wheel valve 360, and the right rear wheel valve 365 for the duration of the wheel valve control 265 activation. This may allow the heated deicing fluid 945 to be dispersed at the left front wheel 920, the right front wheel 922, the left rear wheel 924, and the right rear wheel 926.

Activation of the windshield valve control 270 while the invention 100 is on may cause the control circuit to energize the windshield valve for the duration of the windshield valve control 270 activation. This may allow the heated deicing fluid to be dispersed at the windshield 928.

The operator interface 250 may be housed inside of an operator interface housing 255. In some embodiments, the operator interface 250 may be housed within the dashboard or center console of the vehicle 900.

As used in this disclosure, an "aperture" is an opening in a surface. Aperture may be synonymous with hole, slit, crack, gap, slot, or opening.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "energize" refers to the application of an electrical potential to a system or subsystem.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "housing" is a rigid casing that encloses and protects one or more devices.

As used in this disclosure, a "pump" is a mechanical device that uses suction or pressure to raise or move fluids, compress fluids, or force a fluid into an inflatable object.

As used in this disclosure, a "reservoir" refers to a container or containment system that is configured to store a liquid.

As used in this disclosure, a "spray" is a plurality of liquid drops projected from a nozzle.

As used in this disclosure, a "valve" is a device that is used to control the flow of a fluid (gas or liquid) through a pipe or to control the flow of a fluid into and out of a container.

As used in this disclosure, a "vehicle" is a device that is used for transporting passengers, goods, or equipment.

As used in this disclosure, a "windshield" refers to the front window of a vehicle that is intended to shield the occupants of the vehicle from the wind generated by the normal forward motion of the vehicle.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle traction deicing system comprising:
   a reservoir, a pump, a heater, a plurality of valves, a plurality of wheel nozzles, at least one windshield nozzle, and an operator interface;
   wherein the vehicle traction deicing system applies heated deicing fluid to the plurality of wheels and/or the windshield of a vehicle;
   wherein the reservoir is a holding tank for deicing fluid;
   wherein the reservoir couples to the pump via one of a plurality of distribution lines;
   wherein the reservoir is accessible for refilling through a reservoir cap;

wherein the pump is a device that moves the deicing fluid from a pump inlet to a pump outlet when the pump is energized by an electrical potential applied to the pump;

wherein the pump inlet is coupled to the reservoir;

wherein the pump outlet is coupled to a main valve via one of the plurality of distribution lines;

wherein the main valve blocks the flow of the deicing fluid unless energized by an electrical potential applied to the main valve;

wherein a main valve inlet is coupled to the pump outlet via one of the plurality of distribution lines;

wherein a main valve outlet is coupled to the heater;

wherein the deicing fluid enters the heater at a heater inlet and the heated deicing fluid exits from the heater via a heater outlet;

wherein the source of the heat is a fluid connection to a vehicle radiator cooling system or a heating element located within the heater that is by an electrical potential applied to the heater;

wherein the heater comprises a heater regulator;

wherein the heater regulator prevents the temperature of the heated deicing fluid from going above a preset temperature limit by removing the electrical potential from the heating element or rerouting the fluid connection when the heated deicing fluid is at or above the preset temperature limit;

wherein the heater outlet couples to the plurality of distribution lines which carry the heated deicing fluid to a left front wheel valve, a right front wheel valve, a left rear wheel valve, and a right rear wheel valve;

wherein the heated deicing fluid flows to a windshield valve, either via one of the plurality of distribution lines or by direct coupling when the heater comprises the windshield valve.

2. The vehicle traction deicing system according to claim 1 wherein the plurality of valves comprises the left front wheel valve, the right front wheel valve, the left rear wheel valve, the right rear wheel valve, and the windshield valve;

wherein the left front wheel valve blocks the flow of the heated deicing fluid unless energized by an electrical potential applied to the left front wheel valve;

wherein a left front wheel valve inlet is coupled to the heater outlet via the plurality of distribution lines;

wherein a left front wheel valve outlet is coupled to a first wheel nozzle and a second wheel nozzle via the plurality of distribution lines;

wherein the right front wheel valve blocks the flow of the heated deicing fluid unless energized by an electrical potential applied to the right front wheel valve;

wherein a right front wheel valve inlet is coupled to the heater outlet via the plurality of distribution lines;

wherein a right front wheel valve outlet is coupled to a third wheel nozzle and a fourth wheel nozzle via the plurality of distribution lines.

3. The vehicle traction deicing system according to claim 2 wherein the left rear wheel valve blocks the flow of the heated deicing fluid unless energized by an electrical potential applied to the left rear wheel valve;

wherein a left rear wheel valve inlet is coupled to the heater outlet via the plurality of distribution lines;

wherein a left rear wheel valve outlet is coupled to a fifth wheel nozzle and a sixth wheel nozzle via the plurality of distribution lines;

wherein the right rear wheel valve blocks the flow of the heated deicing fluid unless energized by an electrical potential applied to the right rear wheel valve;

wherein a right rear wheel valve inlet is coupled to the heater outlet via the plurality of distribution lines;

wherein a right rear wheel valve outlet is coupled to a seventh wheel nozzle and an eighth wheel nozzle via the plurality of distribution lines.

4. The vehicle traction deicing system according to claim 3 wherein the windshield valve blocks the flow of the heated deicing fluid unless energized by an electrical potential applied to the windshield valve;

wherein a windshield valve inlet is coupled to the heater outlet via the plurality of distribution lines;

wherein a windshield valve outlet is coupled to the at least one windshield nozzle via the plurality of distribution lines.

5. The vehicle traction deicing system according to claim 4, wherein the plurality of wheel nozzles comprises the first wheel nozzle, the second wheel nozzle, the third wheel nozzle, the fourth wheel nozzle, the fifth wheel nozzle, the sixth wheel nozzle, the seventh wheel nozzle, and the eighth wheel nozzle;

wherein the plurality of wheel nozzles disperse the heated deicing fluid onto the plurality of wheels and onto the ground at the plurality of wheels.

6. The vehicle traction deicing system according to claim 5 wherein the first wheel nozzle is coupled to the vehicle in front of a left front wheel;

wherein the second wheel nozzle is coupled to the vehicle behind the left front wheel;

wherein when the heated deicing fluid is pumped to the first wheel nozzle and the second wheel nozzle, the first wheel nozzle and the second wheel nozzle disperses the heated deicing fluid onto the left front wheel and onto the ground in front of and behind the left front wheel;

wherein the third wheel nozzle is coupled to the vehicle in front of a right front wheel;

wherein the fourth wheel nozzle is coupled to the vehicle behind the right front wheel;

wherein when the heated deicing fluid is pumped to the third wheel nozzle and the fourth wheel nozzle, the third wheel nozzle and the fourth wheel nozzle disperses the heated deicing fluid onto the right front wheel and onto the ground in front of and behind the right front wheel.

7. The vehicle traction deicing system according to claim 6 wherein the fifth wheel nozzle is coupled to the vehicle in front of a left rear wheel;

wherein the sixth wheel nozzle is coupled to the vehicle behind the left rear wheel;

wherein when the heated deicing fluid is pumped to the fifth wheel nozzle and the sixth wheel nozzle, the fifth wheel nozzle and the sixth wheel nozzle disperses the heated deicing fluid onto the left rear wheel and onto the ground in front of and behind the left rear wheel;

wherein the seventh wheel nozzle is coupled to the vehicle in front of a right rear wheel;

wherein the eighth wheel nozzle is coupled to the vehicle behind the right rear wheel;

wherein when the heated deicing fluid is pumped to the seventh wheel nozzle and the eighth wheel nozzle, the seventh wheel nozzle and the eighth wheel nozzle disperses the heated deicing fluid onto the right rear wheel and onto the ground in front of and behind the right rear wheel.

8. The vehicle traction deicing system according to claim 7
wherein an individual nozzle selected from the plurality of wheel nozzles comprises a plurality of nozzle apertures;
wherein the heated deicing fluid is pumped into the individual nozzle via the plurality of distribution lines and sprays out of the plurality of nozzle apertures;
wherein the diameter of the plurality of nozzle apertures determines the distance from the individual nozzle that the heated deicing fluid is sprayed.

9. The vehicle traction deicing system according to claim 8
wherein the plurality of nozzle apertures on the individual nozzle comprise multiple diameters.

10. The vehicle traction deicing system according to claim 8
wherein the at least one windshield nozzle comprises one or more nozzles mounted in front of the windshield and oriented to disperse the heated deicing fluid onto the windshield when the heated deicing fluid is pumped to the at least one windshield nozzle by the pump.

11. The vehicle traction deicing system according to claim 10
wherein the operator interface controls the operation of the vehicle traction deicing system;
wherein the operator interface is electrically coupled to a vehicle electrical system, the pump, the heater, the main valve, the left front wheel valve, the left rear wheel valve, the left rear wheel valve, the right rear wheel valve, and the windshield valve via a plurality of wires;
wherein the operator interface is powered by the connection to the vehicle electrical system.

12. The vehicle traction deicing system according to claim 11
wherein the operator interface comprises a power control, a wheel valve control, and a windshield valve control;
wherein the operator interface comprises a control circuit to sense the power control, the wheel valve control, and the windshield valve control and to energize the heater, the pump, and the plurality of valves.

13. The vehicle traction deicing system according to claim 12
wherein activation of the power control turns the vehicle traction deicing system on;
wherein activation of the power control energizes the pump and the main valve to force the deicing fluid into the heater;
wherein activation of the power control energizes the heater;
wherein activation of the power control places the control circuit located within the operator interface into a state where the control circuit will recognize and respond to activation of the wheel valve control and the windshield valve control;
wherein activation of the power control when the vehicle traction deicing system is already on turns the vehicle traction deicing system off by de-energizing the heater, the pump, and the plurality of valves, and by causing the control circuit to ignore the wheel valve control and the windshield valve control.

14. The vehicle traction deicing system according to claim 13
wherein activation of the wheel valve control while the vehicle traction deicing system is on causes the control circuit to energize the left front wheel valve, the right front wheel valve, the left rear wheel valve, and the right rear wheel valve for the duration of the wheel valve control activation;
wherein activation of the windshield valve control while the vehicle traction deicing system is on causes the control circuit to energize the windshield valve for the duration of the windshield valve control activation.

* * * * *